US012085768B2

(12) United States Patent
Tang et al.

(10) Patent No.: US 12,085,768 B2
(45) Date of Patent: Sep. 10, 2024

(54) OPTICAL MODULE

(71) Applicant: Advanced Semiconductor Engineering, Inc., Kaohsiung (TW)

(72) Inventors: Shih-Chieh Tang, Kaohsiung (TW); Lu-Ming Lai, Kaohsiung (TW); Yu-Che Huang, Kaohsiung (TW); Ying-Chung Chen, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 272 days.

(21) Appl. No.: 17/465,713

(22) Filed: Sep. 2, 2021

(65) Prior Publication Data
US 2023/0063405 A1 Mar. 2, 2023

(51) Int. Cl.
*G02B 6/42* (2006.01)

(52) U.S. Cl.
CPC .......... *G02B 6/4215* (2013.01); *G02B 6/4214* (2013.01)

(58) Field of Classification Search
CPC ...................................................... G02B 6/42
USPC ............................................................ 385/14
See application file for complete search history.

(56) References Cited

U.S. PATENT DOCUMENTS

| 5,442,169 | A | * | 8/1995 | Kunz | G01N 21/7743 |
| | | | | | 250/227.21 |
| 9,110,259 | B1 | * | 8/2015 | Black | G01J 3/36 |
| 11,585,899 | B2 | * | 2/2023 | Nicolaescu | G01S 7/484 |
| 2008/0204747 | A1 | * | 8/2008 | Emmerson | G01N 21/774 |
| | | | | | 385/12 |
| 2013/0005606 | A1 | * | 1/2013 | Chakravarty | G01N 33/54373 |
| | | | | | 356/402 |
| 2014/0140655 | A1 | * | 5/2014 | Chakravarty | G01N 21/7746 |
| | | | | | 385/12 |
| 2016/0018319 | A1 | * | 1/2016 | Hegyi | G01D 5/35316 |
| | | | | | 356/73.1 |
| 2019/0154439 | A1 | * | 5/2019 | Binder | G01B 11/26 |
| 2021/0080637 | A1 | * | 3/2021 | Brick | G02B 27/0172 |
| 2022/0373739 | A1 | * | 11/2022 | Abril | G02B 6/29382 |

FOREIGN PATENT DOCUMENTS

| JP | 2791856 | B2 | * | 6/1998 | |
| JP | 2003149478 | A | * | 5/2003 | ......... G02B 6/12011 |
| RU | 2589450 | C1 | * | 7/2016 | |
| WO | WO-9506853 | A1 | * | 3/1995 | ........... G01C 19/722 |

* cited by examiner

*Primary Examiner* — Kaveh C Kianni
(74) *Attorney, Agent, or Firm* — FOLEY & LARDNER LLP

(57) ABSTRACT

The present disclosure provides an optical module. The optical module includes an optical component disposed in or on a carrier and configured to receive a first light. The optical component is further configured to transmit a second light to a first portion of the carrier and transmit a third light to a second portion of the carrier.

18 Claims, 7 Drawing Sheets

OPTICAL MODULE

BACKGROUND

1. Technical Field

The present disclosure generally relates to an optical module.

2. Description of the Related Art

Silicon photonics is a technology that is being researched and developed worldwide, due to its promise of delivering high performance optical devices built using low-cost silicon chip technologies. Providing a sensor hub having optical devices integrated on a silicon base or similar material is desirable.

SUMMARY

In some arrangements, an optical module includes an optical component disposed in or on a carrier and configured to receive a first light. The optical component is further configured to transmit a second light to a first portion of the carrier and transmit a third light to a second portion of the carrier.

In some arrangements, an optical module includes an optical structure disposed in or on a carrier and configured to distribute lights to a first portion and a second portion of the carrier. The first portion of the carrier is configured to radiate lights toward an outside of the optical module, and the second portion of the carrier is configured to modulate lights inside of the optical module.

BRIEF DESCRIPTION OF THE DRAWINGS

Aspects of the present disclosure are readily understood from the following detailed description when read with the accompanying figures. It should be noted that various features may not be drawn to scale. The dimensions of the various features may be arbitrarily increased or reduced for clarity of discussion.

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1A:
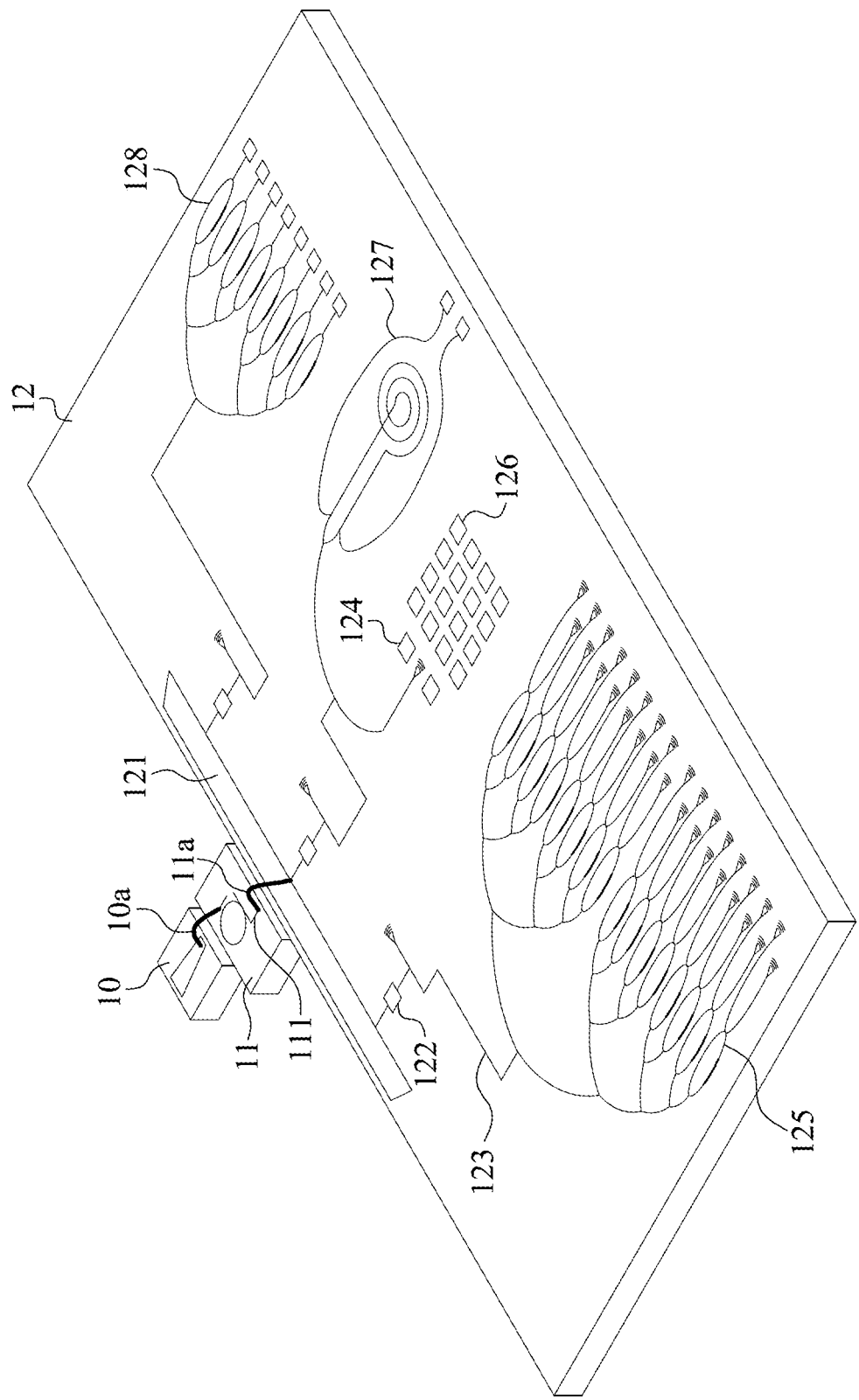
FIG. 1A illustrates a perspective view of an electronic module in accordance with some arrangements of the present disclosure.

The following disclosure provides for many different arrangements, or examples, for implementing different features of the provided subject matter. Specific examples of components and arrangements are described below. These are, of course, merely examples and are not intended to be limiting. In the present disclosure, reference to the formation of a first feature over or on a second feature in the description that follows may include arrangements in which the first and second features are formed in direct contact, and may also include arrangements in which additional features may be formed between the first and second features, such that the first and second features may not be in direct contact. In addition, the present disclosure may repeat reference numerals and/or letters in the various examples. This repetition is for simplicity and clarity and does not in itself dictate a relationship between the various arrangements and/or configurations discussed.

Arrangements of the present disclosure are discussed in detail below. It should be appreciated, however, that the present disclosure provides many applicable concepts that can be embodied in a wide variety of specific contexts. The specific arrangements discussed are merely illustrative and do not limit the scope of the disclosure.

FIG. 1A illustrates a perspective view of an electronic module 1 in accordance with some arrangements of the present disclosure. In some arrangements, the electronic module 1 may include an optical module. In some arrangements, the electronic module 1 may include a light source 10, a converting device 11, and a substrate 12. The substrate 12 may include a light transmitting device 121, a noise cancelling device 122, light paths 123, and sensing units 124, 125, 126, 127, and 128 fabricated in or on or disposed within or on the substrate 12. In some arrangements, the electronic module 1 can also be illustrated using the block diagram as shown in FIG. 1D.

In some arrangements, the light source 10 may include a lighting element or a lighting device that is configured to generate one or more light beams. In some arrangements, the light source 10 may be configured to generate a light beam having a plurality of different frequencies, such as a beam of visible light, white light, infrared (IR) light, ultraviolet (UV) light, and so on. In some arrangements, the light source 10 may be configured to generate a monochromatic light beam having one single frequency. For example, the light source 10 may be configured to generate a laser beam or a light beam having a spectral linewidth of nearly zero. In that regard, in some arrangements, the light source 10 may be a laser source.

In some arrangements, the light source 10 may be physically spaced apart from the converting device 11 and the substrate 12, with a gap between the light source 10 and the converting device 11/substrate 12. For example, the light source 10 may not be in contact with the converting device 11 or the substrate 12. For example, the light source 10, the converting device 11, and the substrate 12 are discrete parts that are manufactured separately as separate components. In some arrangements, the light source 10 may be connected to the converting device 11 through a connection element or a light transmitting element 10a. In some arrangements, the light transmitting element 10a may be configured to transmit the light beam from the light source 10 to the converting device 11. For example, the light transmitting element 10a may be configured to provide an optical path between the light source 10 and the converting device 11. In some arrangements, the light transmitting element 10a may be formed via a three-dimensional microfabrication method. For example, laser beams may be configured to focus on a predetermined location of an optical path or a connection element in a volume of a photoresist. For example, when focused into the volume of the photoresist, the laser beams may initiate two-photon polymerization via two-photon absorption and subsequent polymerization. In that regard, the light transmitting element 10a may include the photoresist.

In some arrangements, the converting device 11 may be configured to receive a light beam from the light source 10, for example, via the light transmitting element 10a. In some arrangements, the converting device 11 may be configured to convert each light beam from the light source 10 into a different light beam. In some arrangements, the converting device 11 may be configured to modulate one or more of the frequency, amplitude, or phase of a light beam from the light source 10. For example, the converting device 11 may be configured to convert a light beam having one frequency to a light beam having another frequency. In some arrangements, the converting device 11 may be configured to change the frequency band and/or frequency range of a light beam from the light source 10. As used herein, a frequency band refers to an interval of frequencies in the frequency domain of a light beam and is defined by a lower frequency and an upper frequency. The description relating to frequencies/frequency bands is likewise applicable to wavelength. For example, the converting device 11 may be configured to change the lower frequency and/or the upper frequency of the frequency band of the light beam from the light source 10 (or from the light transmitting element 10a). In some arrangements, the converting device 11 may be configured to convert a light beam having one frequency into a light beam having a plurality of frequencies. For example, the converting device 11 may be configured to convert or split one light beam (which may have a single frequency or a frequency band) into a plurality of light beams (each may be a monochromatic light beam having a different single frequency or be a light beam having a different frequency band). In some arrangements, the converting device 11 may be configured to provide one or more light beams with which the sensing units 124, 125, 126, 127, and 128 are configured to operate. In other arrangements, the converting device 11 may output the light beam from the light source 10 without modulating the frequency, amplitude, and phase of the light beam for one or more of the sensing units 124, 125, 126, 127, and 128 configured to operate with that light beam. For example, the converting device 11 may receive a light beam from the light source 10 (or the light transmitting element 10a) and output another light beam having a wavelength substantially equal to the received light beam.

In some arrangements, the converting device 11 may include a frequency comb generator. In some arrangements, the converting device 11 may be configured to output or generate light beams having a plurality of frequencies arranged at an equal frequency interval (i.e., frequency comb). In some arrangements, the converting device 11 may be configured to output or generate a broadband optical radiation composed of equally spaced laser beams.

In some arrangements, the converting device 11 may include a micro resonator for effectuating nonlinear wave mixing to produce the frequencies for the frequency comb. In some arrangements, the micro resonator may include a micro resonator based on silicon (Si), fused silica ($SiO_2$), silicon nitride ($Si_3N_4$), silicon carbide (SiC), hydrogenated amorphous silicon (a-Si:H), aluminum nitride (AlN), sapphire ($Al_2O_3$), germanium (Ge), gallium arsenide (GaAs), indium phosphide (InP), lithium niobate ($LiNbO_3$), lithium tantalate ($LiTaO_3$), zinc oxide (ZnO), glass (such as high index glass, fluoride glass, telluride glass, chalcogenide glass), quartz, diamond, and so on. In some arrangements, the converting device 11 may be a $Si_3N_4$ micro resonator. In some arrangements, the converting device 11 may further include one or more optical devices (such as a gain medium, a waveguide, a filter, a collimator, a coupler, and so on) connected with the micro resonator. The optical devices and the micro resonator of the converting device 11 may be connected through one or more light paths 111. The light paths 111 may be light paths such as but not limited to the light paths 123 on the substrate 12 as described below.

In some arrangements, the converting device 11 may be fabricated using standard, complementary-metal-oxide-semiconductor (CMOS) compatible processes and materials. For example, the micro resonator may be made of silicon nitride ($Si_3N_4$) and may be monolithically integrated, and compatible with existing silicon fabrication technology compatible with CMOS-processing.

In some arrangements, the converting device 11 may be physically spaced apart from the substrate 12 with a gap therebetween. For example, the converting device 11 may not be in contact with the substrate 12. In some arrangements, the converting device 11 may be connected to the substrate 12 through a connection element or a light transmitting element 11a. In some arrangements, the light transmitting element 11a may be configured to transmit the light beam from the converting device 11 to the substrate 12. For example, the light transmitting element 11a may be configured to provide an optical path between the converting device 11 and the substrate 12. For example, the light transmitting element 11a may be configured to provide an optical path between the converting device 11 and the light transmitting device 121.

In some arrangements, the substrate 12 may include a silicon photonics substrate or a material platform from which optical devices and/or photonic integrated circuits can be made. In some arrangements, the substrate 12 may include a substrate having a silicon material. In some arrangements, the substrate 12 may include a Silicon on Insulator (SOI) substrate including a silicon substrate, an oxide layer disposed on the silicon substrate, and a silicon layer disposed on the oxide layer. In some arrangements, the substrate 12 may be a light distributing device configured to direct light beams among the light transmitting device 121, the noise cancelling devices 122, and the sensing units 124, 125, 126, 127, and 128. In some arrangements, one or more of the lights transmitting device 121, the noise cancelling device 122, the light paths 123, and the sensing units 124, 125, 126, 127, 128 may be fabricated in the silicon layer of the substrate 12. For example, as shown in FIG. 1C, the substrate 12 may include a silicon base (or a silicon substrate) 12a and a silicon oxide layer 12b disposed on the silicon base 12a. The substrate 12 may further include a waveguide 12d in the silicon oxide layer 12b. In some arrangements, the waveguide 12d may include a patterned layer, such as a patterned silicon layer. In some arrangements, the waveguide 12d may include a plurality of patterned layers on different areas, locations, or layers in the silicon oxide layer 12b. In some arrangements, the waveguide 12d may include or is operatively coupled or connected to a part of the light transmitting device 121 in FIG. 1A. For example, a part of the light transmitting device 121 in FIG. 1A may be a patterned silicon layer in the silicon oxide layer 12b over the silicon base 12a. The substrate 12 may further include a silicon oxide layer 12c disposed on the silicon oxide layer 12b. In some arrangements, the refractive index of the waveguide 12d may be different from the refractive index of the silicon oxide layers 12b and 12c. Light beams may be trapped or confined in the waveguide 12d. In some arrangements, light beams may travel through the waveguide 12d, hit a boundary between the waveguide 12d and the silicon oxide layers 12b and 12c, and bounce back-and-forth off between the waveguide 12d and the silicon oxide layers 12b and 12c at the boundary thereof. In some arrangements, the substrate 12 may include a carrier that one or more of the lights transmitting device 121, the noise cancelling device 122, the light paths 123, and the sensing units 124, 125, 126, 127, 128 may be disposed in or on.

In some arrangements, the light transmitting device 121 may be configured to receive a light beam from the converting device 11, e.g., via light transmitting element 11a. In some arrangements, the light transmitting device 121 may be configured to transmit or direct one or more light beams received toward a corresponding sensing unit among the sensing units 124, 125, 126, 127, and 128. For example, the light transmitting device 121 may be configured to transmit or direct one or more light beams having different frequencies or different frequency bands toward different sensing units. For example, the light transmitting device 121 may be configured to transmit or direct one or more light beams to different light paths leading to different sensing units based on the frequencies or frequency bands of the one or more light beams. For example, the light transmitting device 121 may be configured to filter out at least one light beam (each having a frequency or frequency band different from a frequency or frequency band of interest) from light beams having different frequencies or different frequency bands, such that at least one light beam having a frequency or frequency band of interest remains and is transmitted or directed to one or more corresponding ones of the sensing units 124, 125, 126, 127, and 128. For example, the light transmitting device 121 may be configured to filter out, from all light beams having different frequencies or frequency bands, all other light beam(s) except at least a light beam having a frequency or a frequency band of interest. For example, the light transmitting device 121 may be configured to select at least a light beam having a frequency to pass a light path leading to a sensing unit that can be operated with the light beam having the frequency. For example, the light transmitting device 121 may be configured to select at least a light beam having a frequency band to pass a light path leading to a sensing unit that can be operated with the light beam having the frequency band.

In some arrangements, the light transmitting device 121 may include a demultiplexer (DMUX), such as a DMUX of an arrayed waveguide grating (AWG) type. In some arrangements, the light beam from the converting device 11 may be received through the light transmitting element 11a and demultiplexed by the light transmitting device 121. In some arrangements, a switch (such as the MZI Switch in FIG. 1D) may be connected between the light transmitting device 121 and each of the at least one of the sensing units 124, 125, 126, 127, and 128. In some arrangements, the switch may be configured to distribute light beams among the sensing units 124, 125, 126, 127, and 128. In some arrangements, the switch may be configured to converge light beams to at least one of the sensing units 124, 125, 126, 127, and 128.

In some arrangements, the noise cancelling device 122 may be connected between the light transmitting device 121 and each of the at least one of the sensing units 124, 125, 126, 127, and 128. For example, the noise cancelling device 122 may be interposed in the light paths toward each of the sensing units 124, 125, 126, 127, and 128. In some arrangements, the noise cancelling device 122 may include a micro ring structure. In some arrangements, the noise cancelling device 122 may include a micro ring resonator. In some arrangements, the noise cancelling device 122 may be configured to reduce the noise of the light beam outputted from the light transmitting device 121. In some arrangements, the noise cancelling device 122 may be configured to interfere with the light beam constructively. For example, the noise cancelling device 122 may be configured to increase the intensity of the light beam outputted from the light transmitting device 121. In some arrangements, the noise cancelling device 122 may be configured to function as a switch. In some arrangements, the noise cancelling device 122 may be configured to function as a switch and a noise cancelling unit. In some arrangements, two or more different kinds of noise cancelling device 122 may be located in the light paths moving toward different kinds of sensing units 124, 125, 126, 127, and 128. For example, the noise cancelling device 122 between the light transmitting device 121 and the sensing unit 124 may be different from the noise cancelling device 122 between the light transmitting device 121 and the sensing unit 125 with respect to size, number, resonant wavelength(s), and so on.

In some arrangements, the light paths 123 may be configured to guide or direct light beams among two or more of the light transmitting device 121, the noise cancelling device 122, and the sensing units 124, 125, 126, 127, and 128. In some arrangements, the light paths 123 may be configured to guide or direct light beams between the light transmitting element 11a and the light transmitting device 121. In some arrangements, the light paths 123 and the substrate 12 may be made from or include different materials. In some arrangements, the light paths 123 may include or operatively coupled to the waveguide 12d in FIG. 1C. The light paths 123 may include a patterned layer, such as a patterned silicon layer, physically separated by a pattern of the waveguide 12d. In some arrangements, the light paths 123 and the substrate 12 may have different refractivities or refractive indices. In some arrangements, the light paths 123 may include compound semiconductors, such as III-V materials. In some arrangements, the light paths 123 may be formed by modifying the refractive index of silicon. Methods of modifying the refractive index of silicon may include current injection or local heating.

In some arrangements, each of the sensing units 124, 125, 126, 127, and 128 may disposed in or on different portions of the substrate 12. In some arrangements, each of the sensing units 124, 125, 126, 127, and 128 may include a light receiving device, a light emitting device, or a combination thereof. In some arrangements, each of the sensing units 124, 125, 126, 127, and 128 may include one or more of an optical fiber sensor, a laser-based sensor, an optical chemical and biological sensor, a nanophotonic and plasmonic biosensor, a sensor for terahertz sensing, a sensor for quantum sensing, another type of optical sensor, or so on. For example, the sensing unit 124 may include an optical microphone (or an uPhone), the sensing unit 125 may include a light detection and ranging (LiDAR) sensor, the sensing unit 126 may include a plasmonic filter (or a spectrometer), the sensing unit 127 may include a Sagnac interferometer (or a Gyro), and the sensing unit 128 may include a Peptide (or an electronic nose, an e-nose).

In some arrangements, the sensing unit 124 may be configured to convert acoustic waves into electrical signals by sensing changes in light intensity due to diffraction or interference. In some arrangements, the sensing unit 124 may include a membrane that may be deflected by sound pressure or an acoustic signal. The movement of the membrane may be measured by the change in transmitted light intensity at the sensing unit 124. In some arrangements, the sensing unit 125 may be configured to detect light and range. In some arrangements, the sensing unit 125 may emit laser beams outside of the substrate 12 to ping off objects and return to the source of the laser, measuring distance by timing the travel, or flight, of the light pulse. In some arrangements, the sensing unit 126 may be configured to detect, analyze, or modulate frequency, amplitude, or phase of electromagnetic radiations (such as lights inside of the substrate 12). In some arrangements, the sensing unit 127 may be configured to detect angular rotational velocity and acceleration. The sensing unit 127 may be configured to maintain a reference direction or provide stability in navigation, stabilizers, etc. In some arrangements, the sensing unit 128 may be configured to detect and respond differently to different odors or flavors. In some arrangements, the sensing unit 128 may be configured to mimic biological sense of smell.

In some arrangements, the substrate 12 may include other optical devices fabricated on or in the silicon layer that generate, guide, manipulate, and/or detect light beams. Examples of optical devices may include lasers, optical modulators, photodetectors, optical switches, optical waveguides, and so on. In some arrangements, electronic devices may be fabricated in the silicon layer, along with the optical devices. Examples of electronic devices may include transistors, capacitors, resistors, and inductors. However, it should be noted that the silicon layer may include only optical devices or may include both electronic devices and optical devices.

The sensing units in FIG. 1A is for illustrative purposes only, and the number or the type of the sensing units is not limited thereto. In some arrangements, there may be any number or any type of sensing units in the electronic module 1 depending on design requirements.

In some arrangements, two or more of the sensing units 124, 125, 126, 127, and 128 may be configured to receive light beams having different frequencies or frequency bands. For example, the sensing unit 124 is configured to receive or detect light beams of a frequency band, and the sensing unit 125 is configured to receive or detect light beams of another frequency band. For example, the sensing unit 124 is configured to operate with light beams of a frequency band, and the sensing unit 125 is configured to operate with light beams of another frequency band. In some arrangements, two or more of the sensing units 124, 125, 126, 127, and 128 may be configured to radiate light beams having different frequencies or frequency bands. For example, the sensing unit 124 is configured to radiate light beams of a frequency band, and the sensing unit 125 is configured to radiate light beams of another frequency band. In some arrangements, a first sensing unit on the substrate 12 may be configured to radiate light beams and a second sensing unit on the substrate 12 may be configured to receive a reflecting light of the light beams (radiated by the first sensing unit) as reflected by an object outside of the electronic module 1. In some arrangements, the electronic module 1 may further includes a light receiving device outside of the electronic module 1 (e.g., outside of the substrate 12) and configured to receive light beams radiated by a sensing unit on the substrate 12.

In some arrangements, the electronic module 1 may be a sensor hub that has a plurality of sensing units (such as the sensing units 124, 125, 126, 127, and 128) integrated or disposed on or within the same substrate or carrier. In some arrangements, the sensing units may be integrated onto a silicon base or similar material. The packaging size is reduced at least by an order of magnitude while matching the performance of a system built with discrete components.

In some arrangements, although the sensing units are configured to operate with light beams having different frequencies or frequency ranges, the sensing units in the electronic module 1 may share the same light source 10. For example, given that the light beams can be converted by the converting device 11 and demultiplexed by the light transmitting device 121 to a corresponding sensing unit, the sensing units in the electronic module 1 may share the same light source 10 and the feasible bandwidth can be increased. In addition, by using the light paths 123, costs are minimized since additional optical fibers do not need to be deployed, which is usually quite costly.

Figure 1B:
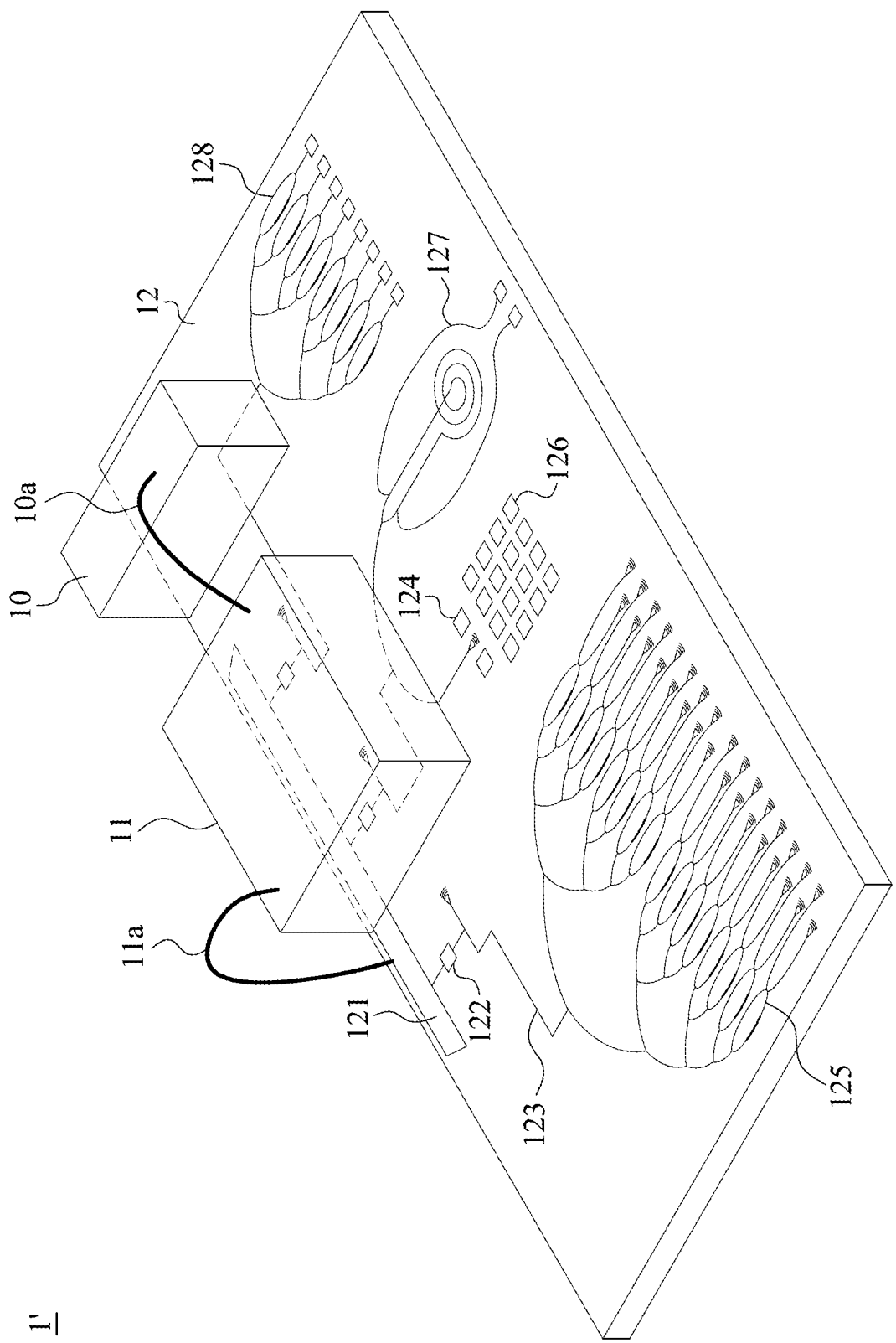
FIG. 1B illustrates a perspective view of an electronic module in accordance with some arrangements of the present disclosure.
Figure 1C:
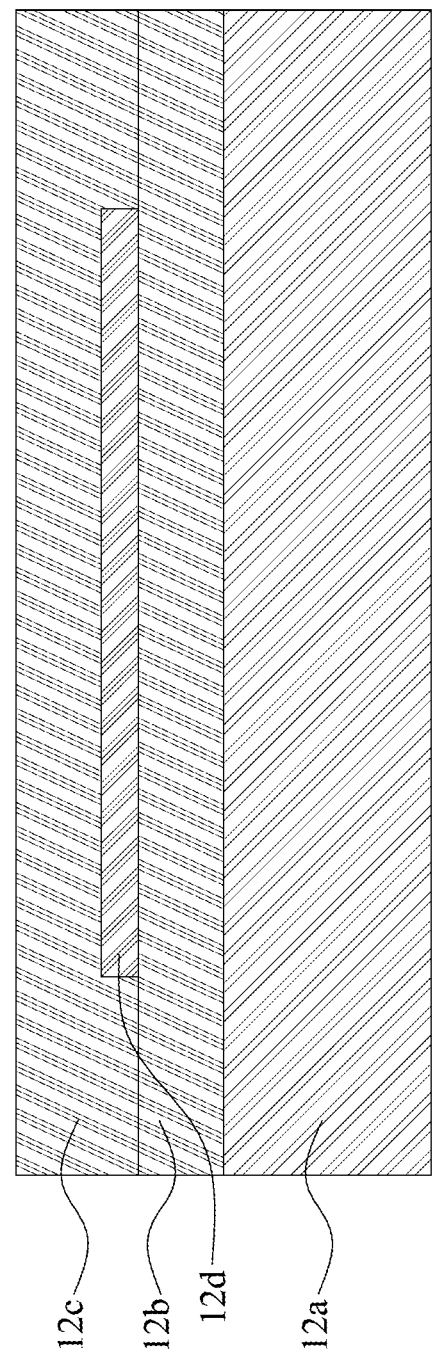
FIG. 1C illustrates a cross-sectional view of a part of an electronic module in accordance with some arrangements of the present disclosure.
Figure 1D:
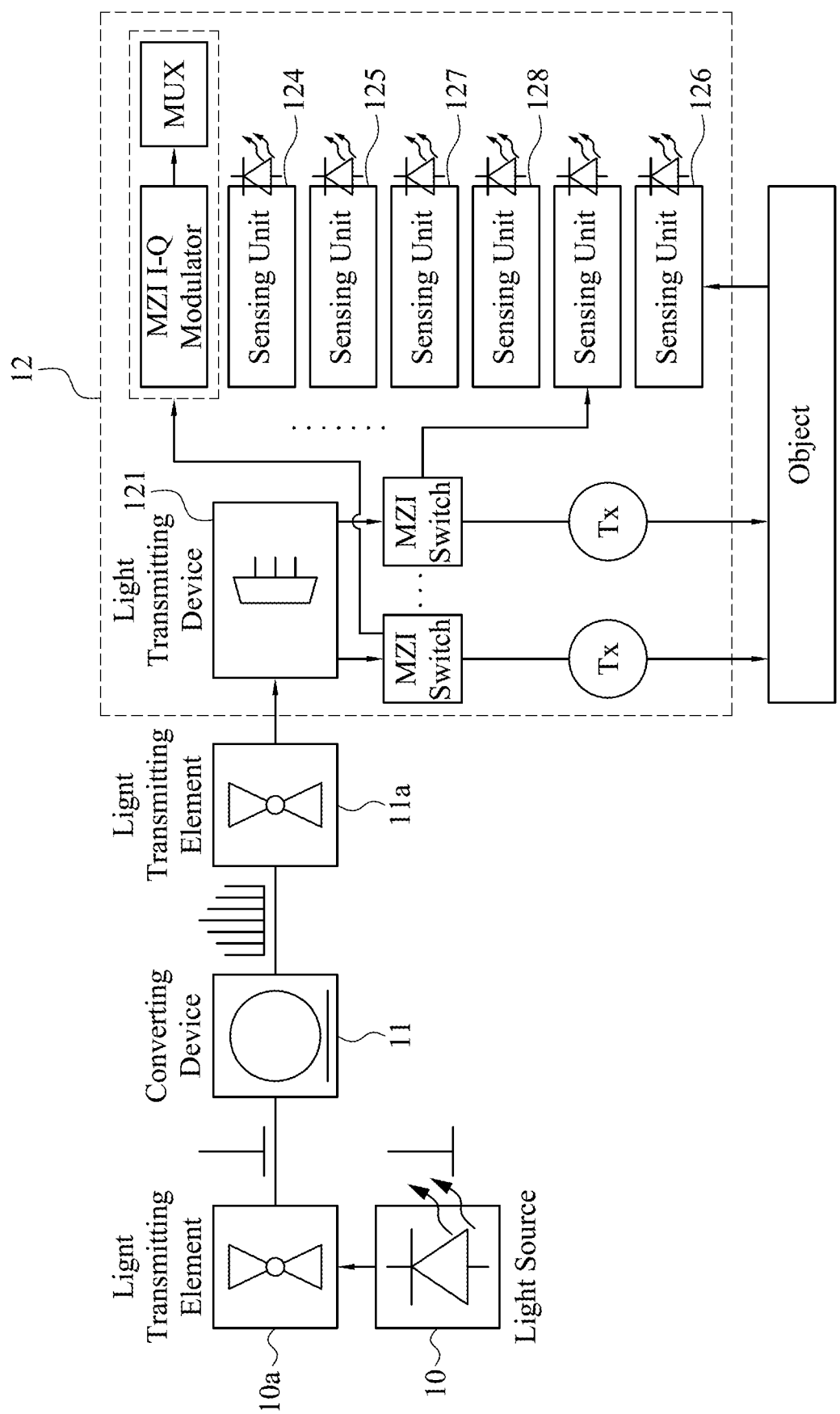
FIG. 1D illustrates a block diagram of an electronic module in accordance with some arrangements of the present disclosure.

FIG. 1B illustrates a perspective view of an electronic module 1' in accordance with some arrangements of the present disclosure. The electronic module 1' in FIG. 1B is similar to the electronic module 1 in FIG. 1A except that converting device 11 and the light source 10 may be disposed over the substrate 12. For example, the converting device 11 and the light source 10 may overlap the substrate 12 along axes that are perpendicular to a surface of the substrate 12. For example, the converting device 11 and the light source 10 may be stacked on the substrate 12. The configurations and the relative locations among the converting device 11, the light source 10, and the substrate 12 may be adjusted according to designed requirements and are not limited to the figures.

Figure 2A:
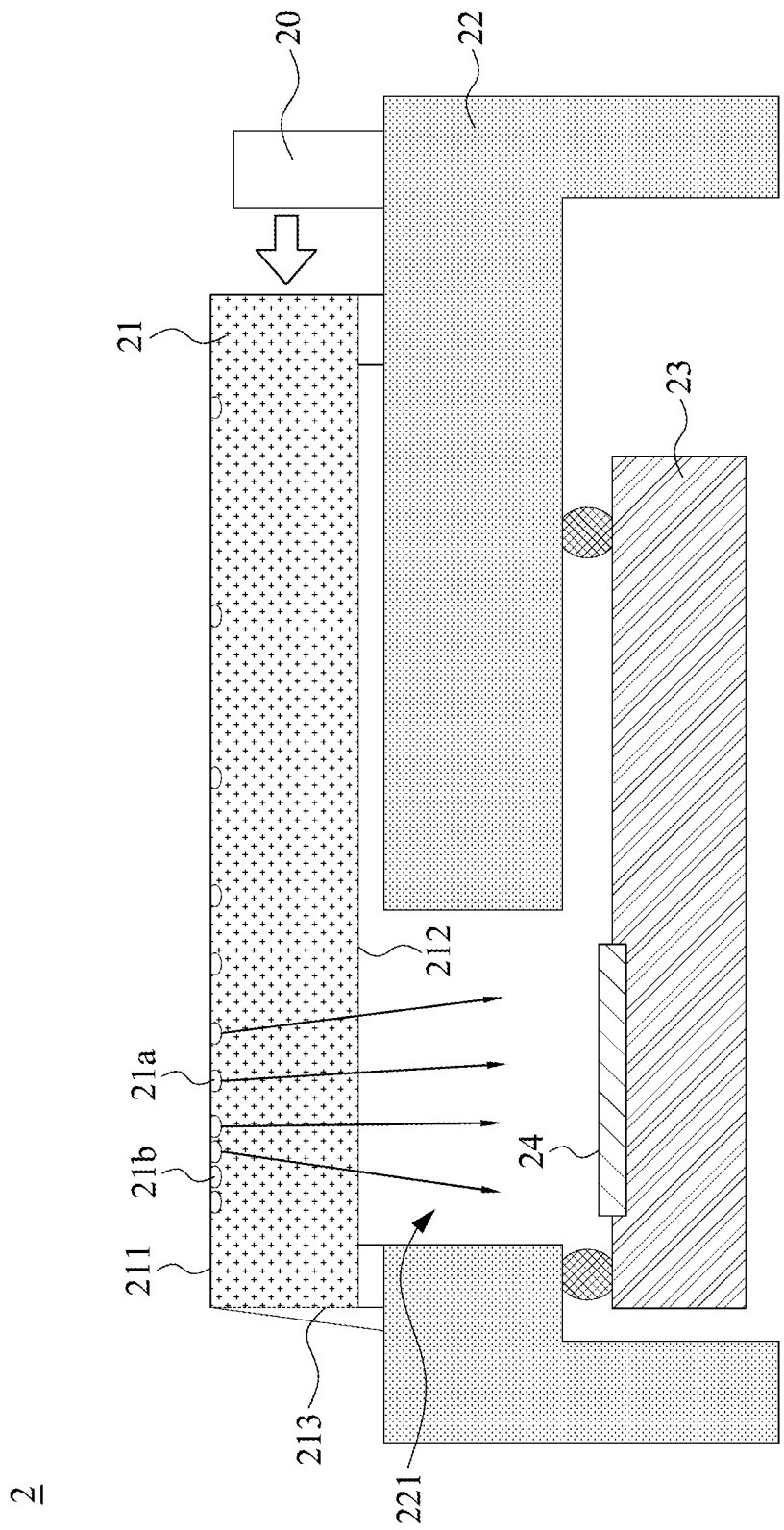
FIG. 2A illustrates a cross-sectional view of an electronic module in accordance with some arrangements of the present disclosure.
Figure 2B:
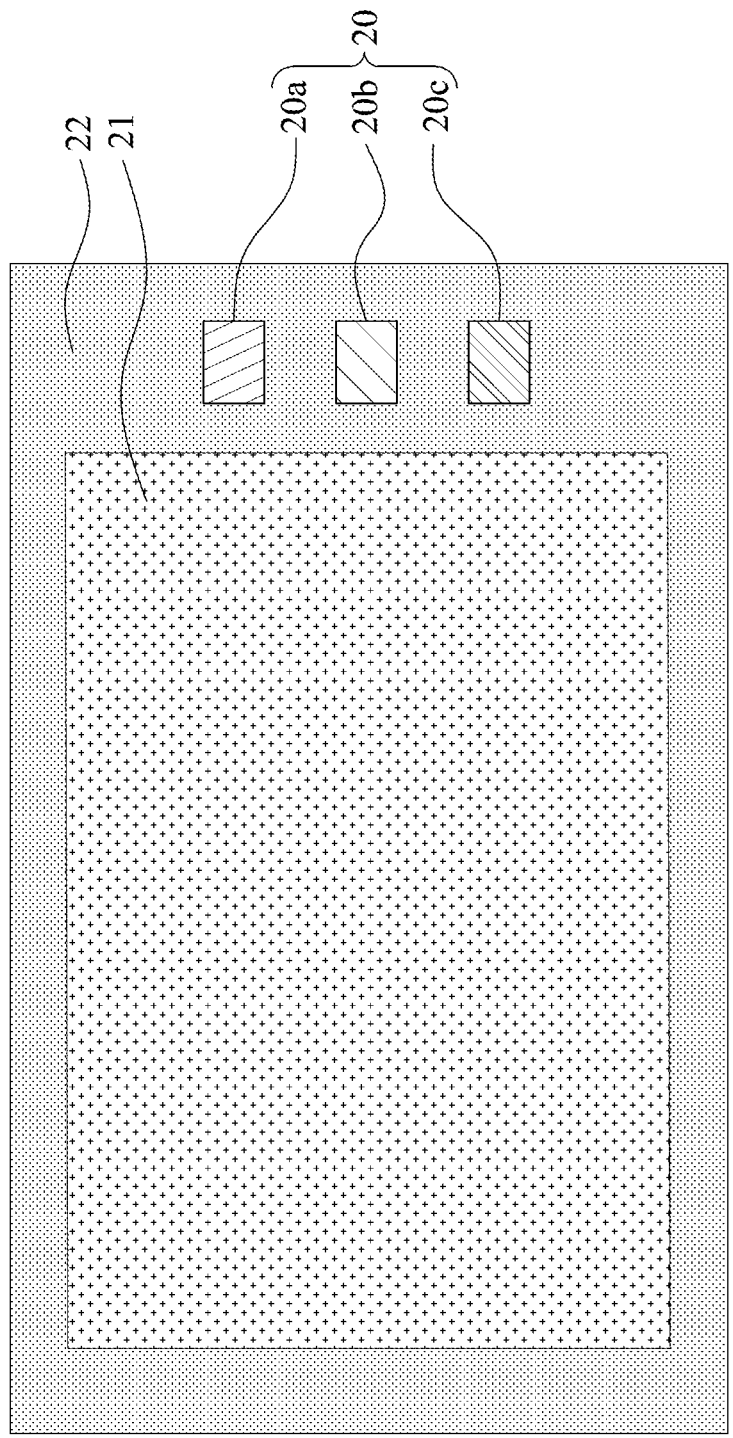
FIG. 2B illustrates a top view of a part of an electronic module in accordance with some arrangements of the present disclosure.
Figure 2C:
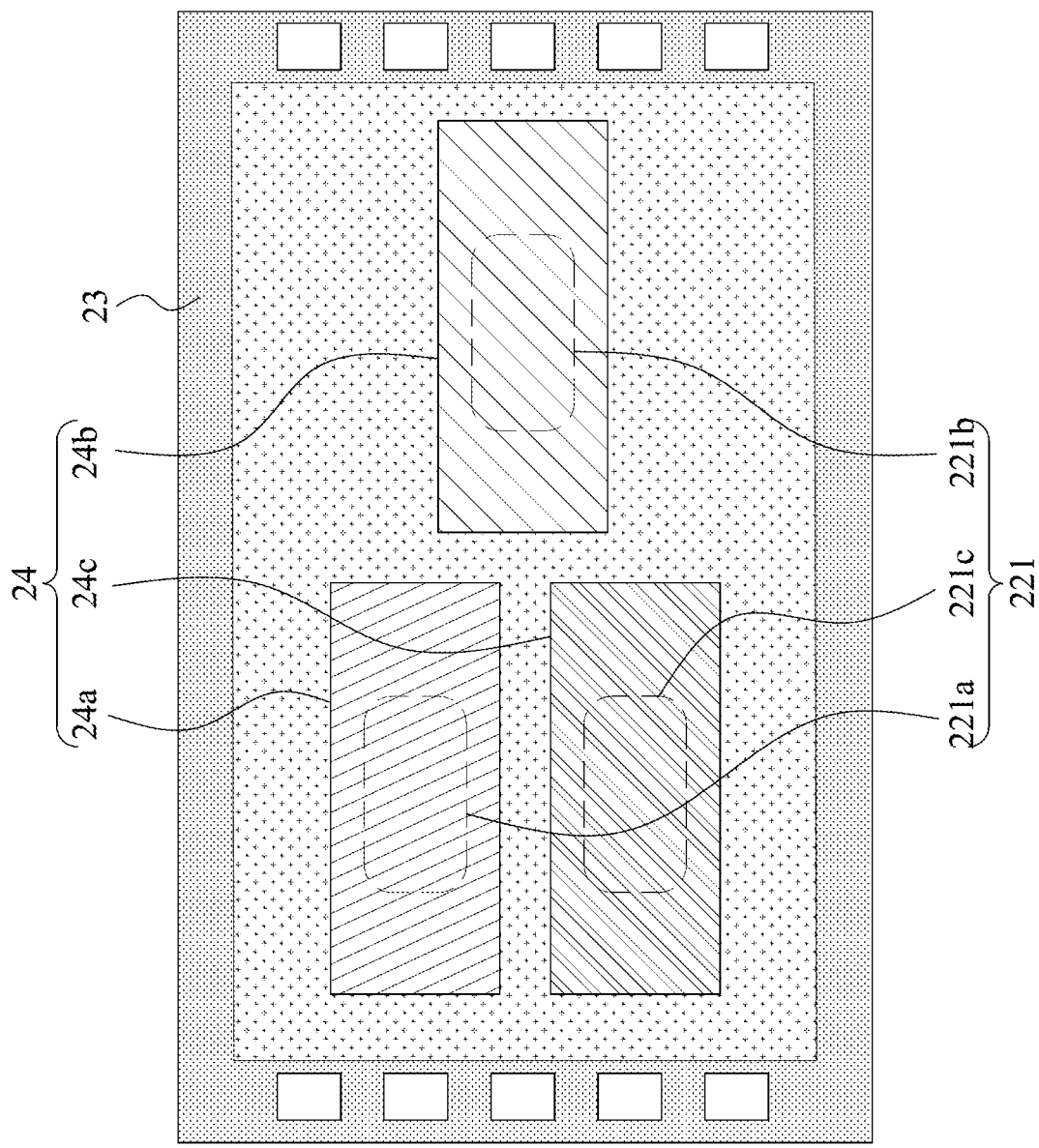
FIG. 2C illustrates a top view of a part of an electronic module in accordance with some arrangements of the present disclosure.

FIG. 2A illustrates a cross-sectional view of an electronic module 2 in accordance with some arrangements of the present disclosure. FIG. 2B illustrates a top view of a part of the electronic module 2 in accordance with some arrangements of the present disclosure. FIG. 2C illustrates a top view of a part of the electronic module 2 in accordance with some arrangements of the present disclosure. Some units in FIG. 2B and FIG. 2C are omitted for conciseness and clearness.

In some arrangements, the electronic module 2 may be another example of a sensor hub. In some arrangements, the electronic module 2 may include light sources 20a, 20b, and 20c (collectively illustrated as a light source 20 in FIG. 2A), a light transmitting device 21, substrates 22, 23, and sensing unit 24a, 24b, and 24c (collectively illustrated as a sensing unit 24 in FIG. 2A).

Each of the light sources 20a, 20b, and 20c may be a light source such as but not limited to, the light source 10 shown in and described with respect to FIG. 1A. In some arrangements, the light sources 20a, 20b, and 20c may be disposed on the substrate 22. In some arrangements, the light sources 20a, 20b, and 20c may be physically spaced apart from one another with a gap therebetween. In some arrangements, light beams generated by the light sources 20a, 20b, and 20c may be different. In some arrangements, light beams generated by the light sources 20a, 20b, and 20c may be the same.

In some arrangements, the light transmitting device 21 may be fabricated in or on or disposed within or on the substrate 22. In some arrangements, the light transmitting device 21 may include a light guide plate. In some arrangements, the light transmitting device 21 may include a surface 211, a surface 212 opposite to the surface 211, and a surface 213 extending between the surface 211 and the surface 212. In some arrangements, the surface 213 may be adjacent to and oblique to (or non-parallel to) the surface 211 and/or the surface 212.

In some arrangements, light transmitting device 21 may be configured to receive light beams from one or more of the light sources 20a, 20b, and 20c through the surface 213. In some arrangements, light transmitting device 21 may be configured to receive light beams from one or more of the light sources 20a, 20b, and 20c through the surface 211. In some arrangements, light transmitting device 21 may be configured to transmit light beams toward one or more of the sensing units 24a, 24b, and 24c through the surface 212.

In some arrangements, the light transmitting device 21 may be configured to convert a light beam from one of the light sources 20a, 20b, and 20c into a different light beam. In some arrangements, the light transmitting device 21 may be configured to modulate one or more of the frequency, amplitude, and phase of a light beam from one of the light sources 20a, 20b, and 20c. For example, the light transmitting device 21 may be configured to convert a light beam having one frequency to a light beam having another frequency. In some arrangements, the light transmitting device 21 may be configured to change the frequency band and/or frequency range of a light beam. In some arrangements, the light transmitting device 21 may be configured to convert a light beam having one frequency into a light beam having a plurality of frequencies. For example, the light transmitting device 21 may be configured to convert or split one light beam (which may have a single frequency or a frequency band) into a plurality of light beams (each may be a monochromatic light beam having a different single frequency or be a light beam having a different frequency band).

In some arrangements, the light transmitting device 21 may be configured to transmit or direct one or more light beams toward a corresponding sensing unit among the sensing units 24a, 24b, and 24c. For example, the light transmitting device 21 may be configured to transmit or direct one or more light beams having different frequencies or frequency bands toward different sensing units. For example, the light transmitting device 21 may be configured to transmit or direct one or more light beams to different light paths leading to different sensing units based on the frequencies or frequency bands of the one or more light beams. For example, the light transmitting device 21 may be configured to filter out at least one light beam (each having a frequency or frequency band different from a frequency or frequency band of interest) from light beams having different frequencies or different frequency bands, such that at least one light beam having a frequency or frequency band of interest remains and is transmitted or directed to one or more corresponding ones of the sensing units 24a, 24b, and 24c. For example, the light transmitting device 21 may be configured to filter out, from all light beams having different frequencies or frequency bands, all other light beam(s) except at least a light beam having a frequency or a frequency band of interest. For example, the light transmitting device 21 may be configured to select at least a light beam having a frequency to pass a light path leading to a sensing unit that can be operated with the light beam having the frequency. For example, the light transmitting device 21 may be configured to select at least a light beam having a frequency band to pass a light path leading to a sensing unit that can be operated with the light beam having the frequency band.

In some arrangements, the light transmitting device 21 may have various locations as shown, including at least a location 21a and a location 21b spaced apart from the location 21a. In some arrangements, light beams may be reflected or directed on the location 21a and the location 21b. In some arrangements, a light beam having a frequency or a frequency band may be directed on the location 21a toward one of the sensing units 24a, 24b, and 24c, and a light beam having another frequency may be directed on the location 21b toward another of the sensing units 24a, 24b, and 24c. In some arrangements, a light beam of a frequency band may be directed on the location 21a toward one of the sensing units 24a, 24b, and 24c, and a light beam of another frequency band may be directed on the location 21b toward another of the sensing units 24a, 24b, and 24c.

In some arrangements, the location 21a and the location 21b may have different refractivities or refractive indices. In some arrangements, the location 21a and the location 21b may have different microstructures. In some arrangements, the location 21a and the location 21b may have different particle densities (such as molecular densities), which may be designed to adjust the intensity of the reflected light beams. In some arrangements, the location 21a and the location 21b may have different degree of crystallinity. In some arrangements, the location 21a and the location 21b may be configured to reflect light beams of different frequencies.

The details of the substrate 23 may be similar to those of the substrate 12 in FIG. 1A described above. The details of each of the sensing units 24a, 24b, and 24c may be a sensing unit such as but not limited to, the sensing units 124, 125, 126, 127, and 128 in FIG. 1A described above. For example, the sensing units 24a, 24b, and 24c may be configured to operate with light beams having different frequencies.

In some arrangements, the sensing units 24a, 24b, and 24c may be exposed (such as partially exposed or entirely exposed) from openings 221a, 221b, and 221c (collectively illustrated as an opening 221 in FIG. 2A), respectively, of the substrate 22. In some arrangements, the substrate 22 may include a carrier or a supporting device configured to support the light transmitting device 21 and/or the light sources 20a, 20b, and 20c. In some arrangements, the light beams transmitted or directed by the light transmitting device 21 may pass through the openings 221a, 221b, and 221c and received by the sensing units 24a, 24b, and 24c. In some arrangements, as shown in FIG. 1C, the substrate 22, like the substrate 12, may include the silicon base 12a and the silicon oxide layer 12b disposed on the silicon base 12a. In some arrangements, the waveguide 12d may include a part of the light transmitting device 21 in FIG. 2A.

In some arrangements, the electronic module 2 may further include an optical filter (not shown in the figures) disposed between the light transmitting device 21 and the portion of the sensing unit 24a exposed from the opening 221a. The optical filter may be outside of the light transmitting device 21. The optical filter may be vertically overlapped with the portion of the sensing unit 24a exposed from the opening 221a. In some arrangements, the optical filter may be configured to filter the light beam toward the sensing unit 24a. For example, light beams generated by the light sources 20a, 20b, and 20c may be guided through the light transmitting device 21 and filtered by the optical filter. In some arrangements, similarly, the electronic module 2 may further include an optical filter disposed between the light transmitting device 21 and the portion of the sensing unit 24b exposed from the opening 221b, and an optical filter disposed between the light transmitting device 21 and the portion of the sensing unit 24c exposed from the opening 221c.

Spatially relative terms, such as "beneath," "below," "lower," "above," "upper," "left," "right" and the like, may be used herein for ease of description to describe one element or feature's relationship to another element(s) or feature(s) as illustrated in the figures. The spatially relative terms are intended to encompass different orientations of the device in use or operation, in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. As used herein with respect to a given value or range, the term "about" generally means within ±10%, ±5%, ±1%, or ±0.5% of the given value or range. Ranges can be expressed herein as from one endpoint to another endpoint or between two endpoints. All ranges disclosed herein are inclusive of the endpoints unless specified otherwise. The term "substantially coplanar" can refer to two surfaces within micrometers (μm) of lying along the same plane, such as within 10 μm, within 5 μm, within 1 μm, or within 0.5 μm of lying along the same plane. When referring to numerical values or characteristics as "substantially" the same, the term can refer to the values lying within ±10%, ±5%, ±1%, or ±0.5% of an average of the values.

The foregoing outlines features of several arrangements and detailed aspects of the present disclosure. The arrangements described in the present disclosure may be readily used as a basis for designing or modifying other processes and structures for carrying out the same or similar purposes and/or achieving the same or similar advantages of the arrangements introduced herein. Such equivalent constructions do not depart from the spirit and scope of the present disclosure, and various changes, substitutions, and alterations may be made without departing from the spirit and scope of the present disclosure.

What is claimed is:

1. An optical module, comprising:
   a light transmitting device disposed on a carrier and configured to receive a first light, wherein the light transmitting device is further configured to transmit a second light to a first portion of the carrier and transmit a third light to a second portion of the carrier;
   a first component disposed on the first portion and configured to receive the second light; and
   a second component disposed on the second portion and configured to receive the third light,
   wherein the first component is configured to convert acoustic waves into signals, measure distance by timing light pulses, analyze electromagnetic radiations, detect angular rotational velocity and acceleration, or mimic biological sense of smell to detect odors or flavors, and the second component is configured to perform another function of above.

2. The optical module of claim 1, wherein the light transmitting device further comprises a first surface to receive the first light and a second surface to transmit the second light and the third light.

3. The optical module of claim 2, wherein the first surface is adjacent to and non-parallel with the second surface.

4. The optical module of claim 1, wherein the carrier further comprises a first path configured to guide the second light and a second path configured to guide the third light.

5. The optical module of claim 4, wherein the carrier further comprises a waveguide supported by a silicon base, and configured to form the first path and the second path.

6. The optical module of claim 5, wherein the first path and the second path are physically separated by a pattern of the waveguide.

7. The optical module of claim 1, wherein a first wavelength of the first light and a second wavelength of the second light are different with respect to each other.

8. The optical module of claim 1, wherein a third wavelength of the third light and a second wavelength of the second light are different with respect to each other.

9. The optical module of claim 1, wherein the first component is configured to emit a fourth light toward an outside of the optical module.

10. The optical module of claim 9, further comprising a first receiver configured to receive a reflecting light of the fourth light reflected by an object outside of the optical module.

11. The optical module of claim 9, further comprising a first receiver outside of the optical module and configured to receive the fourth light.

12. The optical module of claim 1, wherein the carrier further comprises an opening by which the first light, the second light, or the third light is configured to pass through.

13. The optical module of claim 1, further comprising:
   an optical structure disposed in the carrier and configured to distribute lights to the first portion and the second portion of the carrier, wherein the first portion of the carrier is configured to radiate lights toward an outside of the optical module, and the second portion of the carrier is configured to modulate lights inside of the optical module.

14. The optical module of claim 13, wherein the optical structure further comprises a switch configured to distribute lights into the second light and the third light.

15. The optical module of claim 14, wherein the optical structure further comprises a first path configured to guide the second light to the first portion and a second path configured to guide the third light to the second portion.

16. The optical module of claim 14, wherein a first wavelength of the second light and a second wavelength of the third light are different.

17. The optical module of claim 13, wherein the optical structure further comprises a switch configured to distribute lights to a first part and a second part of the second portion.

18. The optical module of claim 13, wherein the optical structure further comprises a switch configured to converge lights to the first portion.

* * * * *